Oct. 29, 1963 W. A. PATZER 3,108,693
MATERIAL TESTING DEVICE
Filed June 27, 1958 6 Sheets-Sheet 1
FIG. 1
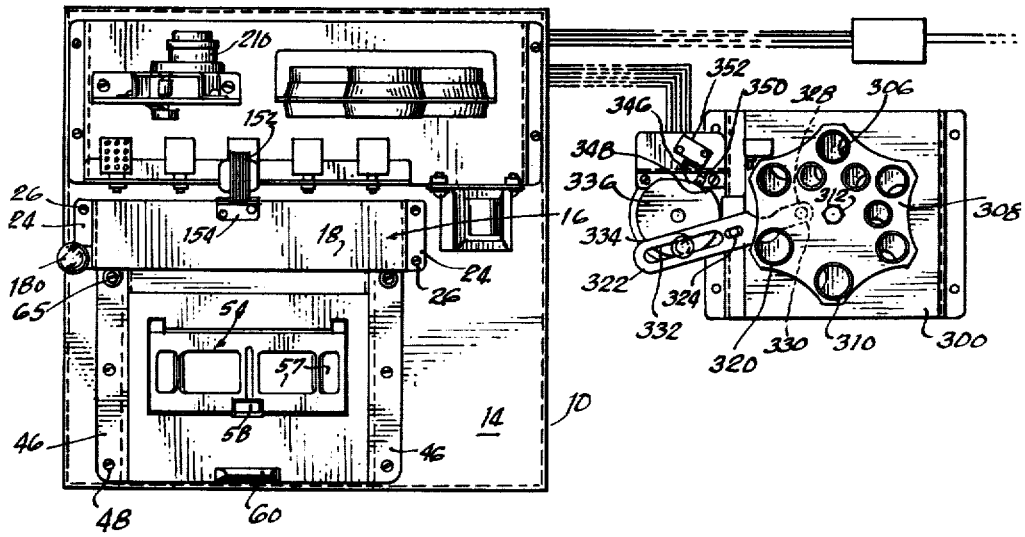
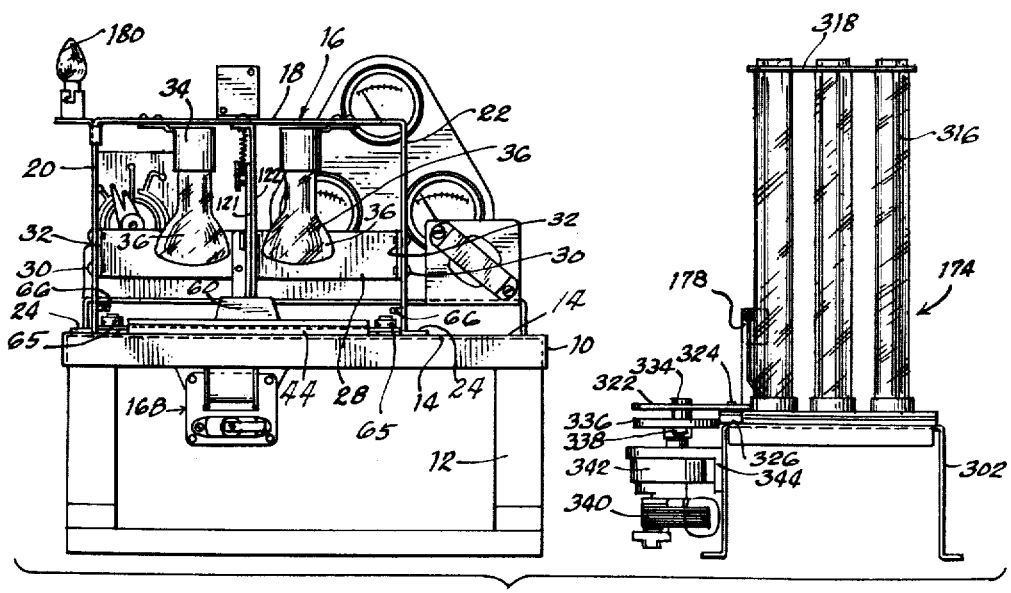
FIG. 2
INVENTOR.
William A. Patzer
BY
Ooms, McDougall, Williams & Hersh
Attorneys

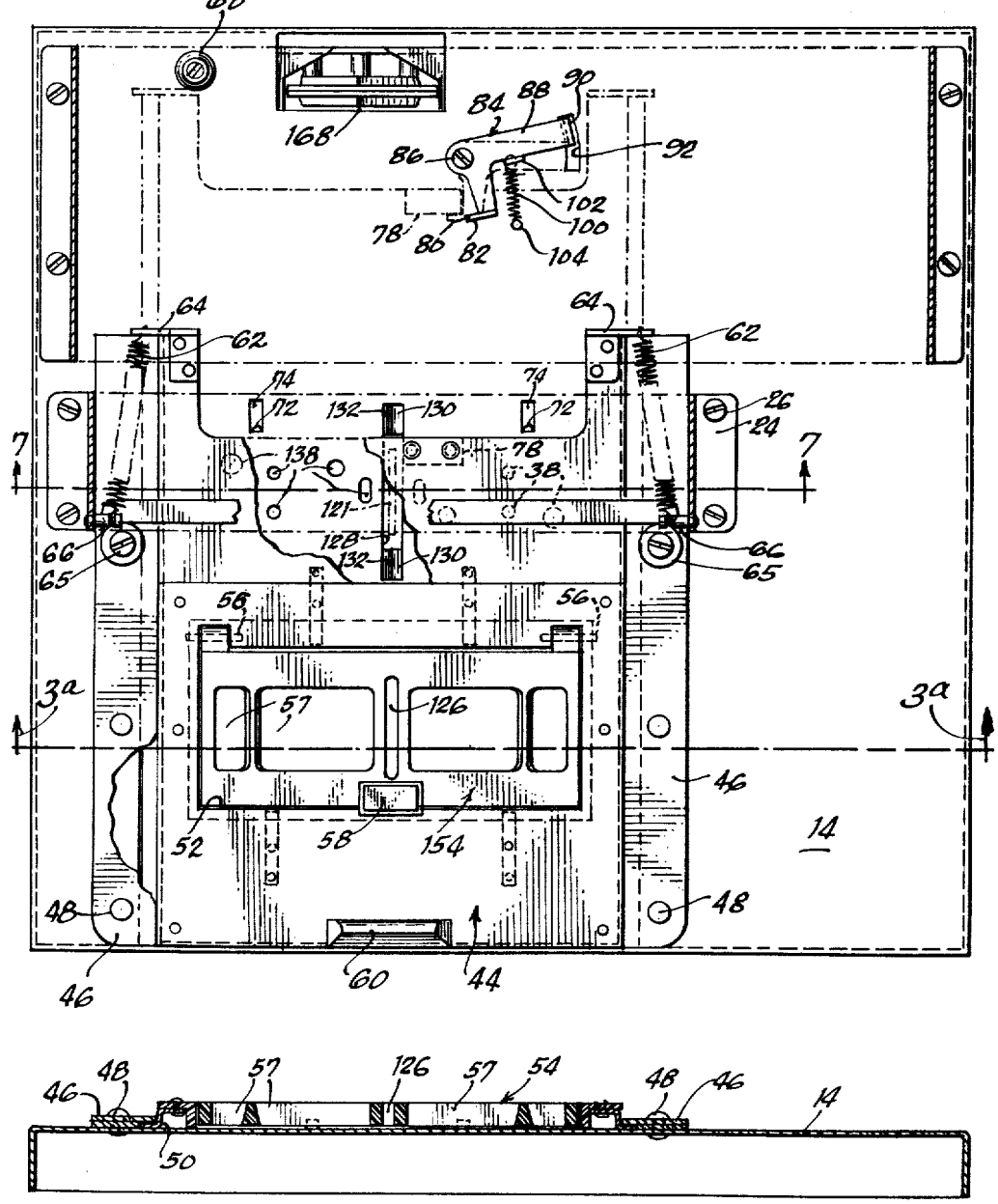

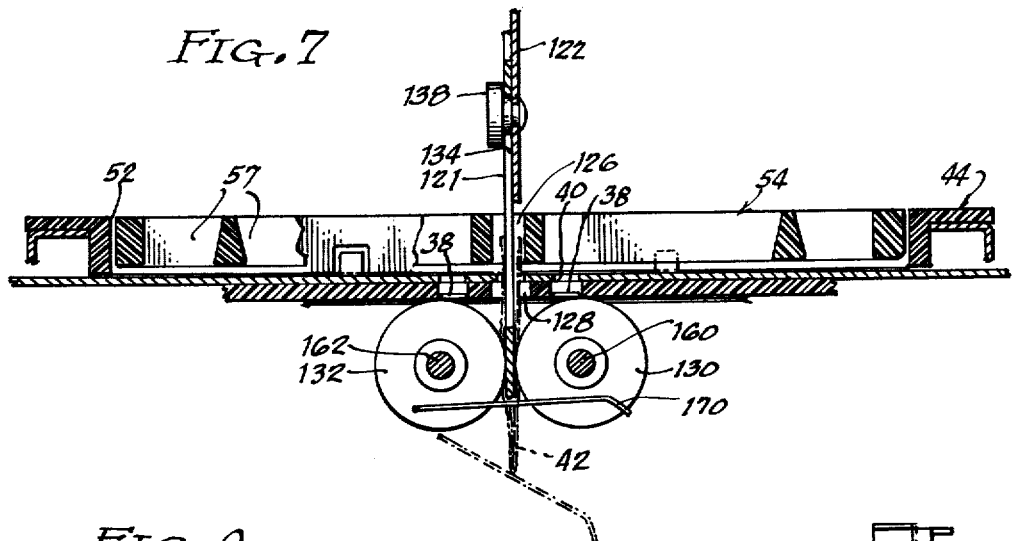
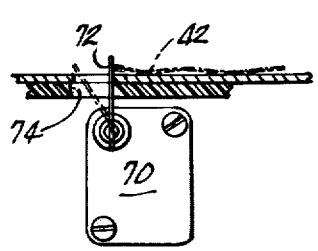
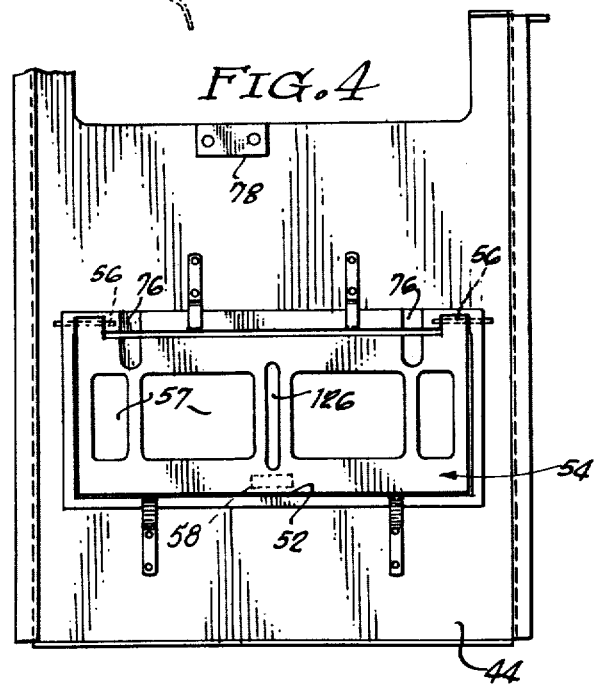
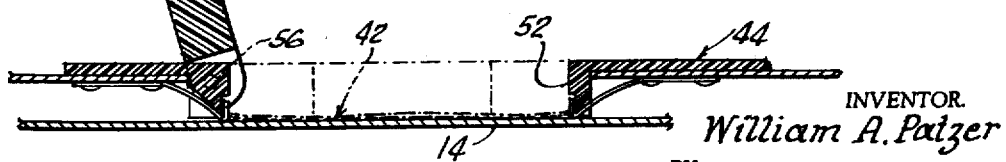

Oct. 29, 1963 W. A. PATZER 3,108,693
MATERIAL TESTING DEVICE
Filed June 27, 1958 6 Sheets—Sheet 4

INVENTOR.
William A. Patzer
BY
Ooms, McDougall, Williams & Hersh
Attorneys

United States Patent Office 3,108,693
Patented Oct. 29, 1963

3,108,693
MATERIAL TESTING DEVICE
William A. Patzer, Chicago, Ill., assignor, by mesne assignments, to Automatic Canteen Company of America, Chicago, Ill., a corporation of Delaware
Filed June 27, 1958, Ser. No. 744,966
8 Claims. (Cl. 209—111.5)

This invention relates to a testing device for the selection and/or rejection of imprinted material or other material having configurations imprinted or otherwise incorporated in or on the material and through which light is capable of transmission in an amount depending upon the character of the configurations or imprint, as represented by paper currency, checks, stubs, tickets and the like sheet material. This invention also relates to a device for making change or making a delivery of other commodities or combinations thereof in response to the payment of money in the form of paper currency or the like and it relates more particularly to the combination of a dispensing unit and a money acceptance unit wherein the latter is adapted to operate on paper currency and the former is adapted to make change or to deliver a commodity or both in response to the acceptance of paper currency of the desired denomination by the acceptance unit.

In general, this invention is addressed to a device by which imprinted material can be separated one from the other and wherein selected material can be accepted while others are rejected for one reason or another, as in the separation of currency of one denomination from another and the acceptance of the currency of one denomination while currency of other denominations or illegitimate currency or paper is rejected. It relates further to the operation of a dispensing mechanism in response to the acceptance of such currency or material.

In addition to the separation and acceptance of currency, a device embodying the concepts of this invention can be used to separate various types of printed material, such as checks, wherein separation can be effected in accordance with the payor, the payee, or the amount, or other information imprinted on the check in an ordinary banking operation; or it may be used in the separation or acceptance of tickets, stubs or the like or for dispensing such materials in response to the acceptance of currency of the required denomination. In other words, a device embodying the concepts of this invention can be used in various operations on imprinted, light transmitting material to effect separation, distribution, acceptance or rejection.

It is an object of this invention to produce a new and simple means for testing light transmittable material having configurations imprinted or otherwise embodied therein and it is a related object to provide a testing device of the type described which is simple in construction, easy and rapid in operation to effect separation of imprinted material, as defined and to provide for acceptance of some and the rejection of others not meeting the test or tests for which the device has been set; which embodies means for the advancement of material to a position for test and which makes use of a test to determine the character of the material advanced before the latter is locked in test position; which operates to hold the material while being tested, and which provides for the removal of the material found to be acceptable by the test; which includes in combination therewith a dispensing device which operates upon the successful completion of the test and acceptance of the material to effect a dispensing operation in response thereto. It is another object of this invention to produce a device of the type described embodying the combination of a dispensing unit or a change maker and a currency acceptance unit wherein the latter operates to test paper currency inserted therein to accept legitimate currency of a desired denomination and the former operates to effect a dispensing or a money-changing operation or both in response to the acceptance of a piece of currency of the desired denomination by the acceptance unit.

These and other objects and advantages of this invention will hereinafter appear and, for purposes of illustration, but not of limitation, an embodiment of the invention is shown in the accompanying drawings, in which:

FIGURE 1 is a top plan view of the device embodying the features of this invention, with a portion of the housing omitted for illustration of elements arranged in the interior thereof;

FIGURE 2 is an elevational view of the device shown in FIGURE 1;

FIGURE 3 is an enlarged top plan view similar to that of FIGURE 1, with parts broken away to show the detailed construction of elements thereof;

FIGURE 3a is a sectional view taken along the lines 3a–3a of FIGURE 3;

FIGURE 4 is a top plan view of a portion of the slide plate employed in the practice of this invention;

FIGURE 5 is a sectional view taken lengthwise through a portion of the plate shown in FIGURE 4;

FIGURE 6 is a sectional elevational view of elements employed in the practice of this invention;

FIGURE 7 is a sectional elevational view taken substantially along the line 7—7 of FIGURE 3;

Figure 9:
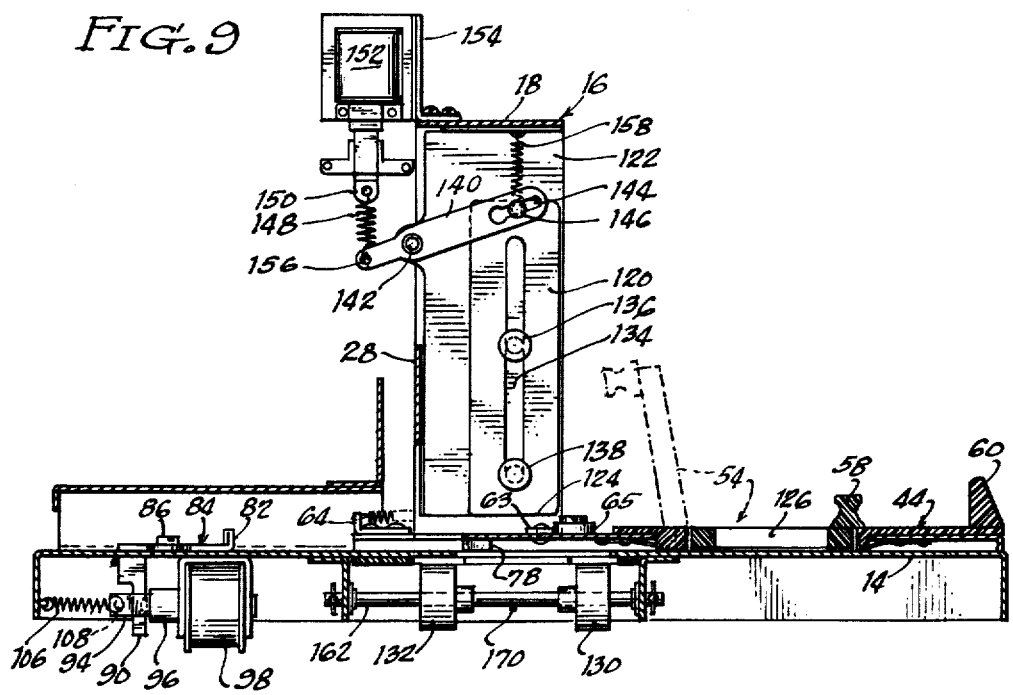
FIGURE 9 is a side elevational view in cross-section of the elements shown in FIGURE 8, with the frame and the supporting lighting elements omitted.
Figure 8:
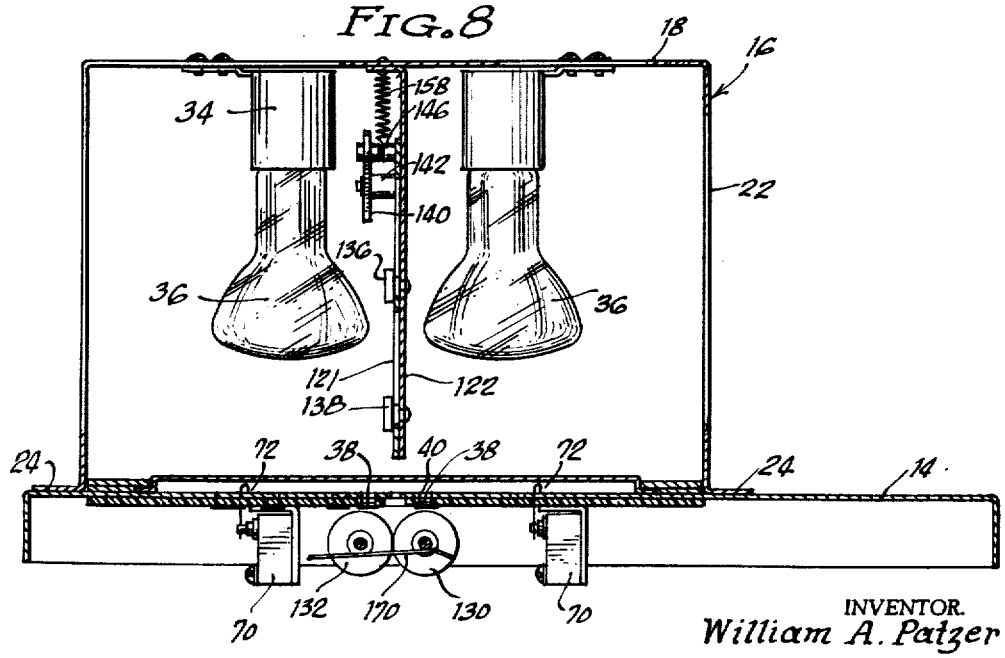
FIGURE 8 is an elevational view in cross-section through the test section of the device shown in FIGURE 2.

The description of the invention will be made with reference to the use of the device for the testing of currency to provide for the acceptance of paper currency of a desired denomination and the rejection of all other papers introduced for test into the machine. It will be understood that the reference to currency will be made only as representative of the various imprinted, light transmittable paper or sheet stock which may be processed through the machine to effect separation in accordance with various configurations embodied therein or thereon and to effect acceptance of certain material and the rejection of others, as previously described.

As the dispensing unit employed in combination with the testing device, description will be made of a unit adapted to give change for the currency, such as the return of two quarters, three dimes and four nickels in response to the acceptance of a dollar bill by the test machine. It will be understood that the changer is merely representative of a dispensing device which may be employed in combination since other devices for the dispensing of commodities, tickets, stubs and the like, alone or in combination with the changer, to make up the difference between the price charged and the currency accepted, may be employed.

Having briefly outlined the scope of the invention, reference will now be made to its construction and operation. The test section, constituting the principal feature of this invention, relies upon the transmission of light through the currency to determine the character of the material and the imprint or configurations embodied therein or imprinted upon the surface. By the direction of light ray from a light source onto one side of the paper or currency and by the arrangement of suitable light responsive cells adjacent the opposite side of the currency, use can be made of the cells to measure the amount of light transmitted through the currency and means can be employed in combination with the cells to effect certain operations as a result thereof, as by arrangement of the light responsive cells so that predetermined cells underlie portions of the currency known to have high light transmission while others of the cells are located to underlie portions of the currency known to have low light transmission because of an imprint or other configuration embodied therein, a pattern can be established from the light transmission test which can be met only by currency of a predetermined denomination as distinguished from other currency or papers. Similarly a pattern can be established for use with papers having certain groups of letters or figures imprinted as on a check, ticket, stub, paper, plastic or the like, as long as the latter is material having some degree of light transmission.

While the basic concepts of this invention reside in the utilization of a light transmission test of the type described, the concepts of this invention further include the use of additional tests in combinations therewith to determine the character of the material advanced to test, to determine whether or not the currency has been removed upon successful completion of the test and to effect various operations as a result thereof. It will be apparent from the following description that these tests can be made dependent one upon the other whereby all of the tests must be successfully met before an impulse is capable of being sent to a dispensing unit employed in combination with the test device or effecting other operations for separation of the materials advanced to the test device.

Referring now to the drawings, the numeral 10 indicates a table of suitable dimension mounted upon a base 12 to position the flat top 14 of the table in spaced relationship with a support.

A frame 16 consisting of a horizontally disposed top wall 18 and side walls 20 and 22 extending downwardly from the lateral edges thereof is secured in upright position to an intermediate portion of the table top 14. For this purpose, flanges 24 are turned outwardly from the bottom end portion of the side wall panels for attachment to the table top, as by means of screws 26. Rigidity is imparted to the frame by the additional use of a cross-brace member 28 which extends crosswise between the rearward edges of the side wall panels and is secured thereto by means of rivets or screws 30 extending through the side walls into engagement with flanges 32 inturned from the ends of the cross-brace members.

Depending from the under side of the top wall 18 are a pair of sockets 34 for receiving a light source such as bulbs 36. The latter can be positioned to direct their rays of light downwardly onto the surface of the table. Instead of light bulbs, other sources of visible or invisible light can be used.

A plurality of light responsive cells 38 are arranged in a predetermined pattern in spaced relation from the light source. For this purpose, suitable openings 40 may be provided through the table top to enable the light responsive cells to be located within the openings or in endwise alignment therewith in position to receive light when transmitted from the light source. In the modification being described, the light responsive cells 38 are arranged so that selected ones of the cells underlie portions of the dollar bill which are free of configuration or imprint, hereinafter referred to as the white cells, so that the amount of light capable of transmission through the dollar bill will correspond to that of the paper of which the currency is formed. Other ones of the light responsive cells can be arranged to underlie portions which are either imprinted with black ink or with green ink, or to underlie both the black ink and green ink portions, hereinafter referred to as the black cells and green cells, respectively, whereby the amount of light transmitted will be less than that transmitted through the paper itself and usually incapable of exceeding a predetermined maximum. The cells can be arranged so that the white cells, the black cells, and the green cells will underlie corresponding white, black and green portions of the bill, notwithstanding the arrangement of the bill when properly positioned between the light source and the cells in test position so that no requirement will exist as to the arrangement of the dollar bill upon insertion for testing.

The bill 42 is advanced to test position between the light source and the light cells by means of a drawer or slide plate 44 in the form of a flat plate dimensioned to have a width less than the spaced relation between the side walls 20 and 22 so as to enable displacement of the slide plate therebetween over the surface of the table between normal and test positions of adjustment. The slide plate 44 is guided in its movement between normal and test position by means of a pair of guide members 46 in the form of channel sections fixed as by screws 48 to the top surface of the table in spaced parallel relation to receive the edge portions of the slide plate in sliding engagement within the confining grooves formed between the upwardly offset sections 50 on the inner edge of the guide members and the table top.

The slide plate is provided with an opening 52 in an intermediate portion thereof and in endwise alignment with the test section. The opening is shaped and dimensioned to correspond to the bill adapted to be tested to enable the bill 42 to be laid flatwise within the opening. To hold down the bill in the slide plate, the slide plate is provided with a door 54 dimensioned to be received within the opening and which is pivotally mounted upon hinge pins 56 for rocking movement between raised and lowered positions about one of the edges of the opening wherein access can be had to insert a dollar bill into the slide plate when the door is in raised position and wherein the door gravitationally rests upon the bill to hold it flatwise in the slide plate when in lowered position. The door 54 is provided with suitable openings 57 in endwise alignment with the light responsive cells to enable the light rays from the light source to strike the bill when advanced to test position between the light source and the light responsive cells. A suitable handle or knob 58 can be provided on the door to enable manual operation. In an automatic machine, the hold-down door can be mechanically actuated for the described movements between lowered and raised positions of adjustment.

The slide plate is adapted to be advanced manually from normal position, shown in solid lines in FIGURE 3, to test position, indicated by broken lines in FIGURE 3. For this purpose, the slide plate is provided with a handle 60 on the forward edge portion thereof. Instead, the plate can be adapted to be displayed by mechanical means responsive to the opening and closing movements of the door, or responsive to actuation by a button or the like. Since the slide plate displacement does not constitute one of the important concepts of the invention claimed, detailed description of such alternative means need not here be given. The slide plate is resiliently urged to normal position by means of coil springs 62 having one end secured to a flange 64 rigid with the forward end portion of the plate, while the other end of each of the coil springs is anchored onto a stud 66 extending inwardly from a rearward portion of the side walls 20 and 22. A bumper 68 extends upwardly from the top surface of the table into the path of the forward edge of the slide plate to stop the plate when in test position. A bar 63, rigid with the slide plate, is positioned to engage a bumper 65 on the table to stop the slide plate when returned to normal position.

One of the previously described tests of the sequence is achieved during advancement of the bill in the slide plate from receiving position to test position. This test operates to determine whether or not the material advanced for testing is of a proper size and dimension before the slide plate is locked in test position and before the light transmission test is carried out.

Briefly described, this initial test for size and shape comprises two or more switch members 70 arranged in laterally spaced part relation on a part of the table 14 either immediately in advance of the test section, but preferably within a part thereof. Each switch member 70 is provided with a switch arm 72 that extends upwardly through openings 74 in the table and into the path of the leading edge of the bill 42 advanced from receiving to test position. The openings 74 are formed to an elongate shape to enable the switch arms 72 to be rocked forwardly, as shown by the dotted line in FIGURE 6, responsive to engagement by the leading edge of the bill to make the switches of the engaged switch arms. The underside of the slide plate is recessed, as at 76, in endwise alignment with the switch arms to enable the slide plate to be displaced thereover without making the switches and to enable the leading edge of the dollar bill to make the switches upon contact.

In the preferred practice of this invention, two such switch arms 72 are used with a spaced relation therebetween corresponding to the width of the bill so as to be engaged by the end portions of the bill. Additional test switches may be employed therebetween if it is desirable to test other sections of the material which is advanced in the slide plate. The switches are connected in series so that the desired signal for continued operation is not received unless all of the switches are made. If less than all of the switches are made, then the latching mechanism hereinafter described is not operated and the light transmission test is not initiated so that the coil springs 62 become effective immediately to return the slide plate to starting position upon release.

In the event that the feelers or switch arms 72 are all engaged to make the corresponding switches, means responsive thereto is rendered effective to latch the slide plate in latching position thereby to hold the dollar bill in test position until the test has been carried out and the dollar bill removed if it is found to be acceptable. Various means for latching the plate in test position can be employed. In the illustrated modification, the latching means comprises an abutment 78 or block secured to the bottom side of the plate in position to be engaged by a latching finger 80 mounted for the shifting movement between unlatching position out of the path of the rear face of the block, shown in solid lines in FIGURE 3, and latching position in the path of the block to prevent return movement of the slide plate from test position, as shown by the broken lines in FIGURE 3.

The latching arm comprises an elongate latching finger 82 on the end of a bell crank lever 84 pivoted for rocking movement in a horizontal plane over the surface of the table on a pivot pin 86 which is fixed to the table. The other arm 88 of the bell crank lever has a portion 90 turned perpendicularly downwardly to extend through an arcuate slot 92 in the table top into operative engagement with a yoke 94 on the forward end of a shaft 96 which is shiftable into and out of a solenoid 98 secured to the bottom side of the table 14. The lever arm is continuously urged to latching position by a coil spring 100 anchored at one end onto a flange 102 on the arm 88 while the other end is secured to a stud 104 fixed to a rearward portion of the table so that the arm will be resiliently urged to latching position response to release by the solenoid. The solenoid shaft 96 is also provided with a spring 106 constantly to urge the shaft towards extended position. For this purpose, the coil spring 106 is anchored at one end onto a pin 108 extending crosswise between the rearward end of the yoke to confine the lever section 90 therein while the other end of the spring 106 is secured to a portion of the table which is turned down. The coil spring 106 dominates the coil spring 100 so that the spring 106 is effective to withdraw the shaft from the solenoid when the latter is de-energized thereby to urge the latching finger out of latching position.

In operation, the solenoid 98 is energized in response to the making of the switches 70 thereby to withdraw the shaft 96 and eliminate the dominance of spring 106 whereby the spring 100 becomes effective resiliently to urge the latching lever to lock about its pivot to latching position.

Responsive to displacement of the latching lever from unlatching to latching position, a switch arm 110 is engaged to make a switch 112 which sends an impulse into a starting relay 206 which has a set of contacts to transmit current to a motor driven rotor or commuator in contact with a printed circuit for sending current to various elements to be described including the light source 36 for illumination.

Figure 11:
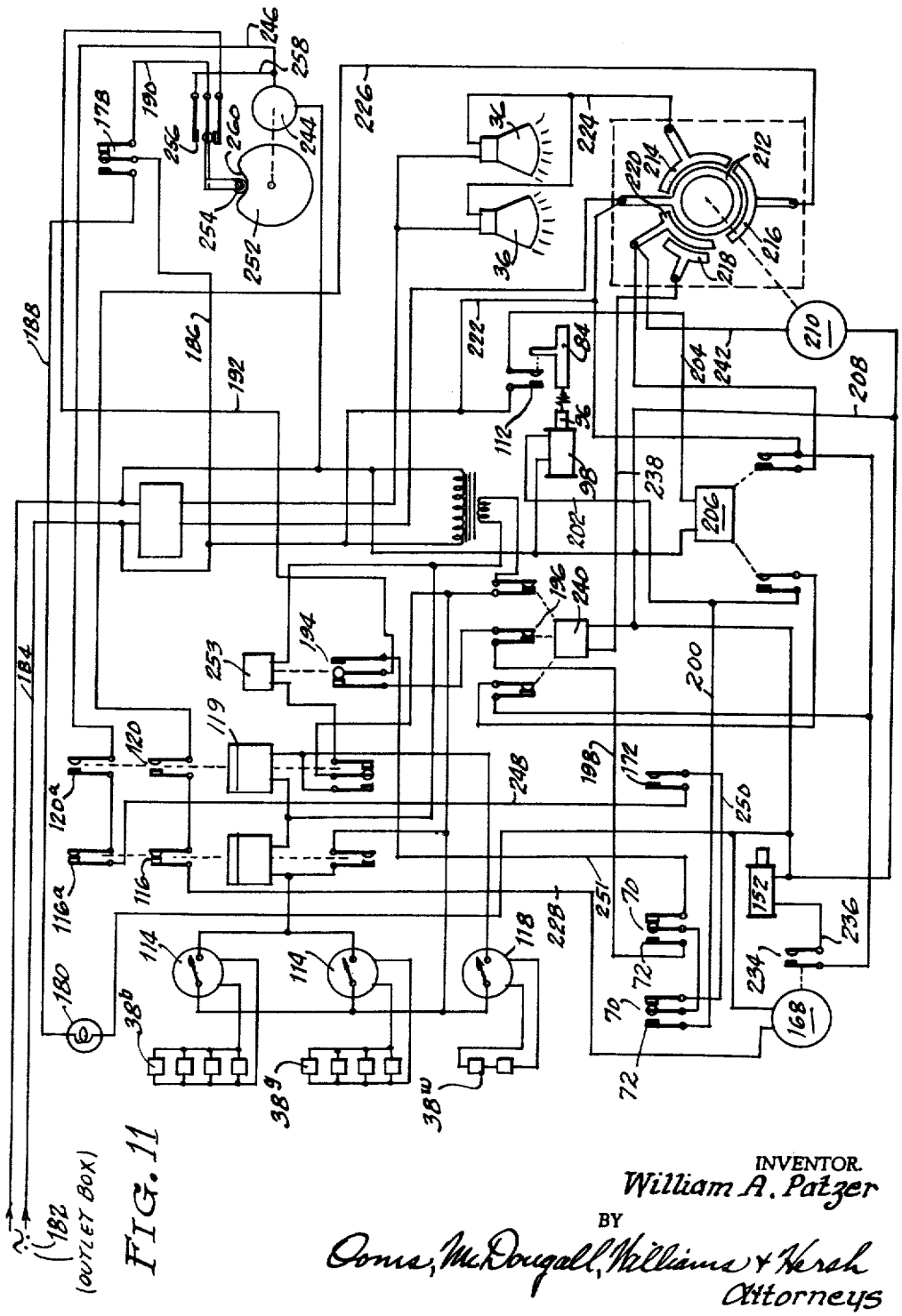
FIGURE 11 is an electrical wiring diagram employed in the device shown in FIGURE 1.

As indicated in the wiring diagram of FIGURE 11, the light responsive cells 38$^b$ and 38$^g$, underlying the black and green portions respectively, are connected by sensitive relays 114 to switch members 116 which are made to enable the passage of current therethrough. The light responsive cells 38$^w$ are connected to a sensitive relay 118 which closes contact to send current into a slave relay 119 to operate a switch member 120 which is open to prevent the passage of current therethrough. For acceptance of the dollar bill, it is necessary that the switch 116 connected with the black and/or green cells 38$^b$ and 38$^g$ remain closed and that the switch 120 connected with the white cells be actuated from open to closed position. Thus if one or more of the light responsive cells adapted to underlie the green or black portions of the dollar bill having low light transmission are instead underlying an area of high light transmission, the current transmitted from the cells through the relay will operate to break the switch 116 and thereby prevent the passage of current so that the bill will be found not to be acceptable. If the light responsive cells 38$^w$ adapted to underlie portions of the bill having high light transmission are instead covered by a portion of the bill characterized by low light transmission, the cells will be incapable of operation through the relay to make the switch 120 thereby to prevent the passage of current. Thus either by opening the switch 116 operatively connected with the black or green cells or failure to close the switch 120 operatively connected to the white cells, will result in the finding that the bill is unacceptable. While the green and black cells 38$^b$ and 38$^g$ can be connected in series, it is preferred to arrange these cells in parallel and while the white cells 38$^w$ can be connected in parallel, it is preferred for most effective operation to connect these cells in series so that the failure of one will result in the failure of the group in effecting the desired function.

Figure 10:
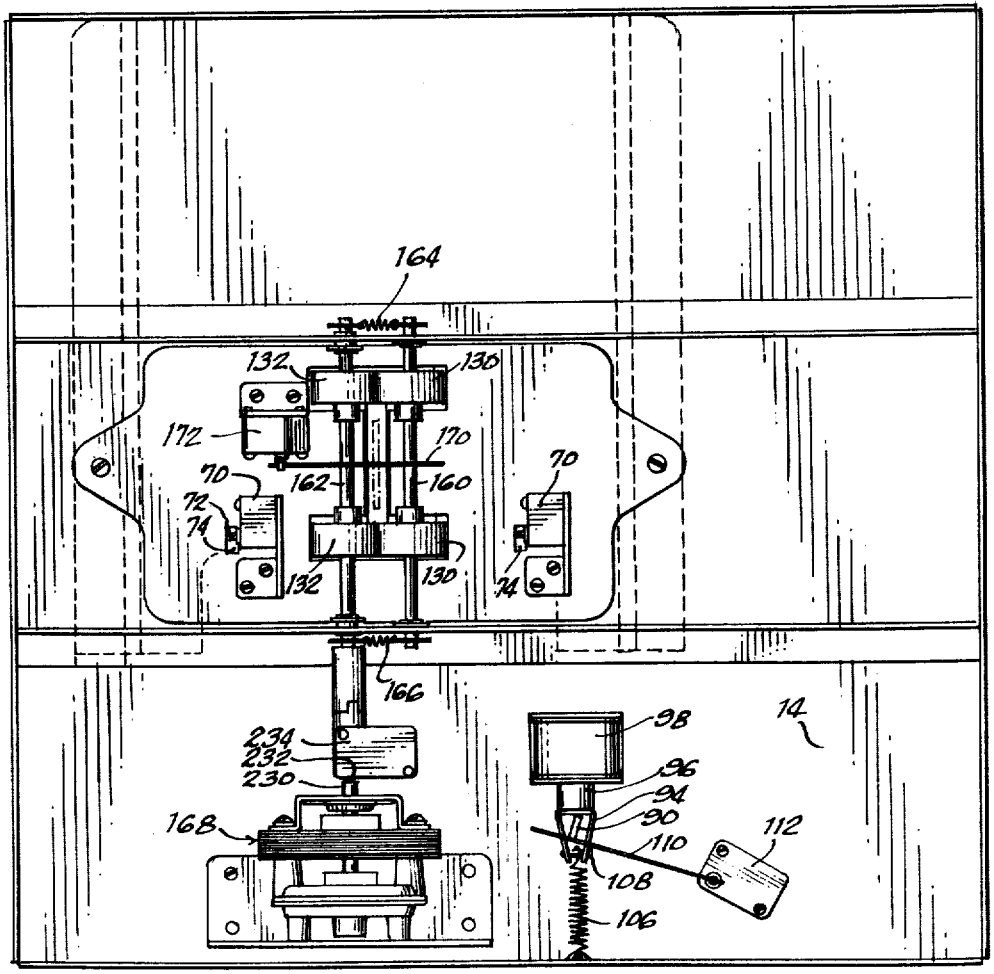
FIGURE 10 is a plan view from the bottom side of the device shown in FIGURE 1.

In the event that the bill is found to be acceptable, means are initiated through the printed circuit to strip the bill from the slide plate while the latter is still in test position. Such means, illustrated in FIGURES 7, 8, 9 and 10 of the drawings, comprises a guillotine plate 121 mounted on a supporting plate 122 for reciprocal movement in a direction perpendicular to the plane of the bill and in a crosswise alignment with about the center thereof to between retracted and operated position of adjustment. In retracted position, as shown in FIGURES 9 and 10, the edge of the guillotine plate is spaced from the slide plate to enable movement of the slide plate between normal and test position. During movement to operative position, the edge 124 of the guillotine passes through an aligned slot 126 in the door of the slide plate, and an aligned slot 128 in the underlying portion of the table to engage the center of the bill and fold the bill to effect displacement of the folded bill from the pocket in which it is located in test position, through the underlying slot 128 in the table, and into engagement with dispensing rollers 130 and 132 which take over from the guillotine to complete the removal of the dollar bill, all of which is illustrated in FIGURE 7 of the drawing.

The guillotine comprises an elongate plate and, for reciprocal movement between operative and retracted position, the guillotine plate is provided with the elongate slot 134. A pair of spaced headed studs 136 and 138, rigid with the supporting plate 122, extend through the slot 134 in operative engagement to guide the guillotine in its relative movement. The studs 136 and 138 can be so spaced as to operate in the slot to define the operated and retracted positions of adjustment of the guillotine. It will be understood that the elements can be interchanged to provide the studs on the guillotine and the slot in the supporting plate.

In the event that the ibll is found to be aceptable, means operated positions of adjustment is effected by means of a lever 140 pivoted intermediate its ends on a pin 142 fixed to a lateral portion of the support plate 122. One end of the lever is provided with an elongate slot 144 adapted slidably to receive a stud 146 fixed to an upper end portion of the guillotine 120. A coil spring 148 is anchored at one end to a shaft 150 shiftable into and out of a stripper solenoid 152 fixed by a bracket 154 to the housing. The other end of the coil spring 148 is anchored onto a stud 156 on the free end portion of the lever 140, offset from its pivot. Thus, the stripper solenoid 152 operates through the coil spring 148 to urge the lever to rock about its pivot in the clockwise direction to effect displacement of the guillotine towards its operated position of adjustment. The force for effecting such movement increases in response to the retraction of the shaft into the solenoid.

Another coil spring 158 secured at one end to the top wall 18 and anchored at the other end onto the stud 146 operates constantly to urge the guillotine towards its retracted position of adjustment but with a force insufficient to overcome the effective force of the spring 148 when tensioned by retraction of the shaft 150 into the solenoid. The spring 158 takes over, however, when the shaft 150 is displaced outwardly to relieve tension on the spring 148, and the spring 158 operates resiliently to urge the guillotine towards retracted position.

The pair of rollers 130 and 132 is mounted beneath the table with the nip between the rollers aligned with the guillotine 120 and with the slot 128 through which the guillotine is projected in the table. The rollers are mounted on shafts 160 and 162 respectively, one of which (162) is journaled in bearings fixed to the depending skirts of the housing, while the other is rotatably mounted in elongate slots in the walls of the housing to enable displacement in the direction towards and away from the other shaft. The shafts are interconnected by coil springs 164 and 166 constantly to urge the rollers on one shaft into operative engagement with the rollers on the other, and the shaft 160 is mounted for free rotational movement responsive to force transmitted between the rollers. In the alternative, a positive driving relationship may be employed between the shafts, as by means of interconnected gears, belts or the like to effect concurrent turning movement in opposite directions. The driving shaft 162 is operatively connected to a clutch-type of motor 168 to effect rotational movement thereof. Thus the rollers are turned together in a downward direction at the nip to effect downward displacement of the folded bill 42 when advanced into the nip of the rollers by the guillotine 120 in response to the displacement thereof to its operated position of adjustment which, preferably, is beyond the access of the rollers.

In order to avoid operative engagement between the rollers and the guillotine, it is desirable to dimension the guillotine plate to have a width which is less than the width of the bill and to subdivide the rollers into laterally spaced apart pairs wherein the spaced relation therebetween is greater than the width of the guillotine plate but less than the width of the dollar bill so that the guillotine plate can be displaced to operated position between the pairs of rollers without engagement by the rollers while the edges of the dollar bill are brought into gripping relation between the rollers, as indicated in FIGURES 7, 9 and 10 of the drawings.

After the dollar bill has been stripped as described, the latching finger 80 is released so that the slide plate will be free to be returned to normal starting position and the device readied for another cycle of operation.

Located in endwise alignment with the guillotine but beyond the end thereof when in operated position, is an arm 170 of a switch 172 which lies in the path of the dollar bill to be engaged by the folded edge of the dollar bill after the rollers have taken over for displacement. The switch arm 170 is displaced, as indicated by the broken line in FIGURE 7, to make the switch 172 only in response to the removal and delivery of a dollar bill from the test section of the device. Even though the test is made and the dollar bill is found to be acceptable, unless the bill is stripped from the test section for delivery to the cash box or receiver, the switch 172 will not be made. The switch 172 is tied into the line which connects to a dispensing motor of the money-changer or dispensing unit by which the desired change is delivered or merchandise is vended, and unless the acceptable dollar bill is given up by the machine the dispensing or vending operation is not carried out.

In a dollar bill selector, it is desirable to prevent access to the test mechanism or to the dollar bill after it has been advanced to test position, otherwise it would be possible to interfere with the operation of the device and possibly erroneous operation of the machine. To protect the unit, the test section is adapted to be enclosed within a housing which preferably covers the test unit and extends from the rearward end portion thereof to an intermediate portion of the slide table, as indicated by the broken lines defining the outline of the housing in FIGURE 1. Thus, the door 54 with the dollar bill 42 will be completely confined within the housing when displaced to test position, while the door will be outside of the housing to permit access thereto for the insertion or removal of the bill when in normal or retracted position. When the device is used to effect separation of stubs, checks, tickets or other printed matter, the enclosure of the test section is not so important.

The dispensing unit 174 operated in combination with the acceptance unit and in response to the acceptance of the currency thereby will be described with reference to a device for making change for a doller bill by returning two quarters, three dimes and four nickels. It will be understood that the change-making unit can be adapted to embody the features of the described invention with other combinations of change for the accepted currency.

The change-making unit comprises a flat topped table 300 mounted upon legs 302 to hold the table in spaced relation with a support. The table top is provided with a plurality of spaced openings 306, two of which are dimensioned to enable passage of a coin of the size of a quarter therethrough, three of which are dimensioned to enable a coin of the size of a dime to pass therethrough and four of which are dimensioned to enable a coin of the size of a nickel to pass therethrough. Stationarily mounted in closely spaced apart parallel relation above the top of the table is another plate 308 having corresponding openings 310 extending therethrough but offset circumferentially from the corresponding openings 306 in the table top using the point 312 as the center.

Each coin opening 310 is provided with an upstanding collar 314 for receiving coin tubes 316 in registry with the openings in the plate to enable coins in the tubes to pass flatwise therethrough. The upper end portions of the tubes are supported by an aperture plate 318.

A dispensing plate 320 is mounted in the space between the table top and the plate 308 for reciprocal rotational movement about the pivot pin 312 between a normal and an operated position of adjustment. The dispensing plate 320 is formed with openings extending therethrough corresponding to the openings in the table top and the plate 308 both in dimension and in arrangement but with the openings in the dispenser plate in registry with the openings in the plate 308, when in normal position, and with the openings 306 in the table top 300, when in the operated position, to effect displacement of the lowermost coins in each stack from alignment with the openings 310 into alignment with the table openings 306 to enable passage therethrough.

Reciprocable rotational movement of the dispenser plate 320 between normal and operated positions is effected by means of a lever arm 322 pivotally mounted intermediate its ends for rocking movement about a pin 324 extending upwardly from a bracket 326 fixed to the table. One end of the pivotally mounted lever is pivotally connected at 328 to a stud 330 depending from the underside of the dispenser plate. The other end of the lever is formed with an elongate slot 332 dimensioned slidably to receive a stud 334 fixed at an offset position on a disc plate 336 mounted for rotational movement with a shaft 338 of a driving motor 340. The motor, which is of a conventional electrical type and which is provided with a speed reducer 342 to slow the rotation of the drive shaft, is mounted upon a bracket 344 fixed to one of the legs 302.

The disc plate 336 may be formed with a cam edge 346 having a recessed portion 348 and a switch arm 350 of a switch member 352 is urged into constant engagement therewith to break the switch when the follower on the end of the arm is displaced into the recessed portion and to make the switch when the follower is cammed outwardly from the recessed portion onto the peripheral surface of the disc plate. The follower is adapted to be in the recessed portion to break the switch when the dispenser plate is in normal position and to be displaced outwardly to make the switch when the dispenser plate is in other than in normal position.

Reference is made to the copending application Ser. No. 732,673, filed May 2, 1958, now Patent No. 2,967,452 and entitled "Currency Selector Device," for a more detailed description of the slide plate construction and operation. Reference is also made to the copending application Ser. No. 732,672, filed May 2, 1958, now Patent No. 2,957,387 and entitled "Test Device for Printed Papers and Elements of Same," for a more detailed description of the latching means for holding the door in test position, and reference can be made to the copending application Ser. No. 732,671, filed May 2, 1958, and entitled "Paper Test Device—Removal Means," for a more detailed description of the stripper mechanism and its operation. Reference is further made to copending application Serial No. 745,143, filed June 27, 1958, now abandoned and entitled "Change-Making Device" for a more complete description of a dispensing means operative in combination.

Having defined the structural elements, description will now be made in greater detail of the operation of the device as employed in combination with a unit for giving change for a dollar bill. Obviously, other devices can be operated if desired in response to the access of the bill from the test unit.

When used in combination with the device 174 for making change, the coin tubes 316 of the change-maker must contain coins in suitable amounts to make the coin switch 178. If the tubes are empty, the switch will be open and the empty light 180 on the machine will be illuminated to indicate the existing condition. Under the latter circumstance, current will pass from the outlet 182 through lines 184, and 186 and 188 to the light 180 and return rather than pass through the lines 190 and 192 to the test machine. Thus, when the tubes 316 are empty, the empty light will be lit and the line to the test machine through the switch 178 will be broken.

In the following description of the operation of the machine, it will be assumed that the tubes are properly filled with coins and that the switch 178 will be made.

Starting with the slide plate 44 in retracted position, as shown by the solid lines in FIGURE 2, the door 54 can be rocked about its pivot to raised position. This permits access to the pocket adapted to receive the paper or currency. After insertion of the dollar bill 42, the door is rocked about its pivot to lowered position within the opening to hold down the dollar bill in the pocket of the slide plate.

The slide plate can be displaced manually forwardly over the top of the table to test position with the dollar bill properly located between the light source 36 and the light cells 38. If the paper placed in the pocket of the slide plate has a dimension corresponding to a legitimate dollar bill and if it is laid flatwise in the pocket, independently of its position, that is, whether it is face up or face down, the leading edge of the dollar bill will engage the switch members 72 of the switches 70 to make the switches during final movement of the dollar bill to test position. This will enable current to flow through line 192, through the switch 194 and switch 196 through line 198 and then through the switches 70, when made, for continued passage through lines 200 and 202 to the latching solenoid 98. The solenoid 98 will thus become energized to cause retraction of the shaft 96 whereby the latching lever 84 is permitted to rock from unlatching to latch-position with the latching finger 80 in the path of the block 78 to prevent displacement of the slide plate from test position.

Responsive to displacement of the latching lever to latching position, the switch 112 will be made as described to enable current to flow from the outlet through lines 184, 202 and 204 to the starting relay 206. The relay 206 enables current to flow through line 208 to a timer motor 210 which actuates a commutator having one contact in engagement with the central hot strip 212 while the other contact sequentially engages a light strip 214, a stripper strip 216, a reset strip 218, and a motor strip 220 which overlaps the reset strip. Current reaches the central strip 212 through line 222 in direct communication with the outlet.

It will be apparent that if less than all of the switch fingers 72 are engaged to make the switches 70, current will be incapable of flow as described to the lock solenoid 98. As a result, the latching lever 84 will not be rocked to latching position so that the slide plate will be free for immediate return with the paper still being retained in the pocket to starting position to enable removal of the paper without operation of the test elements.

If the paper has properly made the switches 70 and the latching means has been effected, the motor driven commutator then takes over for subsequent operations. As the commutator is rotated into engagement with the light strip 214, current will flow through line 224 to the lamps 36 to cause their illimination. If the areas of the dollar bill overlying the cells 38$^b$ and 38$^s$ prevent light transmission in an amount to activate either of the relays 114, the switches 116 will remain closed. If the areas of the dollar bill overlying the cells 38$^w$ permit transmission of light in the amount to activate the relay 116, the switches 120 will be made. Then, upon contact of the commutator with the stripper strip 216, current will be able to flow through lines 226 through the switch 120 and sequentially through the switch 116 into line 228 for passage to the stripper motor 168 to effect turning movement of the shafts 160 and 162 on which the rollers 130 and 132 are mounted.

The stripper motor is of the clutch type which provides for immediate stops when the current is cut off. The shaft 230 of the clutch-type motor is displaced upon operation to release a button 232 on a switch 234. When the switch is made, current will flow through line 236 to the stripper solenoid 152 to effect retraction of the shaft 150 with concurrent downward displacement of the guillotine 120 to its operated position of adjustment. As the guillotine is displaced from its retracted to operated position through the slots 126 and 128 in the aligned door and table, it engages the central portion of the dollar bill 42 whereby the bill is folded and carried with the guillotine through the slot 128 and into the nip of the underlying pairs of rollers 130 and 132 which are being turned by the motor 168. As the edges of the dollar bill are brought into engagement with the rollers, the rollers take over from the guillotine to continue the displacement of the folded dollar bill for delivery into a cash box or receiver. As the folded dollar bill is carried beyond the guillotine, the leading edge of the dollar bill comes into engagement with the switch arm 170 to make the switch 172.

It will be apparent that if the switch 116 operatively connected to the black and green cells 38^b and 38^g in parallel is opened, or if the switch 120 fails to close, current will be incapable of flow to the stripper motor 168 and to the solenoid 152. Under such circumstances, indicating failure of the paper to meet the tests for acceptability, the paper will remain in the slide plate for return with the slide plate to normal position outside of the housing to enable removal.

Whether or not the paper or dollar bill is acceptable, continued movement of the motor driven commutator on the printed circuit will bring the commutator into contact with the reset strip 218 to enable current to flow through line 238 to a reset relay 240 which operates through lines connected therewith to reset the solenoid 98 and the solenoid 152 and the various switches, thereby to inactivate the lock solenoid and release the slide plate to enable return of the slide plate by the coil spring 62 to retracted position. It will be apparent that upon operation of the reset relay 240 current will be incapable of flow by the usual path to the commutator motor 210. In order to continue operation of the commutator motor to complete the cycle of the commutator, use is made of the motor strip 220 to transmit current directly to the motor through the commutator and through line 242. Thus, the motor will continue to operate until the commutator reaches starting position.

In order for the changer motor 340 to operate, current will have to flow thereto from line 246 through switches 120^a and 116^a through line 248 and through switch 172 which is made in response to the displacement of the dollar bill from the slide plate. In order for current to flow to switch 172, it will be necessary for the current to flow through line 250 which is connected to the switch members 70 and is capable only of flow therethrough when the switches are unmade in response to the release of the switch arms 72 upon removal of the dollar bill from the slide plate. Thus, the dollar bill will have to be removed from the slide plate to enable current to flow through the switches 70 to the motor 244, and the dollar bill will have to have made the switch 172 for the continued flow of the current to the motor, and switches 120^a will have to be made and switches 116^a will have to remain made in the line.

It will be evident that current will be capable of flow to the dispensing motor 244 only until the reset relay is operated in response to the rotational movement of the commutator. Thus the impulse directed to the dispensing motor 244 will be insufficient to insure the continued operation of the dispensing motor through a complete cycle. Thus the motor 340 is adapted to be operated by a separate current brought into effect in response to the initial impulse directed to the motor through the currency selection circuit. Such initial impulse will cause the motor to operate for an amount sufficient to rotate the cam 336 to bring the follower 350 out of the recess 348 onto the peripheral surface of the cam 336 to make the switch 352. Thus current is capable of flow from lines 184, 186 and 199 through the made switch 352 to send current through line 356 directly to the motor 340.

Responsive to the operation of the motor, the cam disc 336 is operated to effect rocking movement of the lever 322 about its pivot 324 whereby the plate 320 is operated to effect displacement of the lowermost coins in each of the tubes from the tube position to the openings in the table through which the coins drop for displacement through a suitable chute or a like delivery means to the operator. It will be understood that the cam member 336 may constitute a unit separate and apart from the disc member having the stud 334 thereon for operation of the lever.

The driving motor 340 will continue to operate independently of the test circuit until the follower 350 re-enters the recess 348 to break the switch 352 upon completion of the dispensing cycle.

It will be evident from the foregoing detailed description that pay-out of change or other merchandise by the machine will depend upon the existence of certain conditions including the making of switch 120^a and the allowance of switch 116^a to remain made, as controlled by the light transmission test, the making of the switch 172 in response to the delivery of an acceptable dollar bill, and the unmaking of the switches 70 in response to the removal of the dollar bill from the slide plate. Failure of any one of these conditions to exist will prevent pay-out or delivery. It will be evident also that the described sequence of operations can be achieved when test means other than the light transmission test are employed to determine the acceptability or non-acceptability of the dollar bill or other paper or currency. Thus, while the inventive concepts are directed to the combination which makes use of a light transmission test in series with the other described tests, it will be understood that the light transmission test may be replaced by another test in the series for control of operation.

It will be further understood that changes may be made in the details of construction, arrangement and operation without departing from the spirit of the invention, especially as defined in the following claims.

I claim:

1. In a device for testing a material having light transmission characteristics and configurations imprinted or embodied therein,
   (I) a housing,
   (II) a test section within the housing including
      (a) a light source,
      (b) a plurality of light responsive cells in spaced relation from said light source and arranged in a predetermined pattern with respect to portions of said material with and without configurations,
   (III) a material advancing means shiftable between a retracted position and a test position for advancing said material to a predetermined position between said light source and said light cells when in test position including
      (a) a receiver in said advancing means located outside of said housing when in retracted position and between said light source and light cells when in test position,
      (b) means for guiding said material advancing means during movement between retracted and test position,
      (c) a stop means in position to engage the advancing means when advanced to test position,
      (d) other stop means in position to engage said advancing means when returned to retracted position,
   (IV) means for latching said advancing means in test position in response to advancement of a suitable material for test including
      (a) an abutment on said advancing means,
      (b) a latching member shiftable into and out of the path of said abutment between latching and unlatching positions respectively,
      (c) switch means operative in response to advancement to test of a material suitable for testing, (d) means controlling movement of said latching member between latching and unlatching position in response to operation of said switch means, and (V) means for effecting removal of said material from test position in response to the finding of acceptability of the material in test including (a) an actuating member mounted for shifting movement between normal and operated positions through the path of said material to effect displacement thereof during movement from normal to operated position, (b) means for effecting displacement of said actuating member from normal to operated position, (c) means for releasing said latching means responsive to completion of the test and subsequent to operation of said actuating member when the latter operates to remove an acceptable material, and (d) means operative in combination with said actuating member for operative engagement of said material upon displacement with the actuating member to operated position.

2. In a device for testing a material having light transmission characteristics and configurations imprinted or embodied therein, (I) a test section including (a) a light source, (b) a plurality of light responsive cells in spaced relation from said light source and arranged in a predetermined pattern with respect to portions of said material with and without configurations, (II) a material advancing means shiftable between a retracted position and a test position for advancing said material to a predetermined position between said light source and said light cells when in test position including (a) a receiver in said advancing means located outside of said housing when in retracted position and between said light source and light cells when in test position, (b) means for guiding said material advancing means during movement between retracted and test position, (c) a stop means in position to engage the advancing means when advanced to test position, (d) other stop means in position to engage said advancing means when returned to retracted position, (III) means for latching said advancing means in test position in response to advancement of a suitable material for test including (a) an abutment on said advancing means, (b) a latching member shiftable into and out of the path of said abutment between latching and unlatching positions respectively, (c) switch means operative in response to advancement to test of a material suitable for testing, (d) means controlling movement of said latching member between latching and unlatching position in response to operation of said switch means, and (IV) means for effecting removal of said material from test position in response to the finding of acceptability of the material in test including (a) an actuating member mounted for shifting movement between normal and operated positions through the path of said material to effect displacement thereof during movement from normal to operated position, (b) means for effecting displacement of said actuating member from normal to operated position, (c) means for releasing said latching means responsive to completion of the test and subsequent to operation of said actuating member when the latter operates to remove an acceptable material, and (d) means operative in combination with said actuating member for operative engagement of said material upon displacement with the actuating member to operated position.

3. A testing device as claimed in claim 1 in which the light source comprises a source of radiant energy and in which the light responsive cells comprise cells which are responsive to the transmission of radiant energy.

4. In a device for testing a material having light transmission characteristics and configurations imprinted or embodiment therein, (I) a housing, (II) a test section within the housing including (a) a light source, (b) a plurality of light responsive cells in spaced relation from said light source and arranged in a predetermined pattern with respect to portions of said material with and without configurations, (III) a material advancing means shiftable between a retracted position and a test position for advancing said material to a predetermined position between said light source and said light cells when in test position including (a) means for guiding said material advancing means during movement between retracted and test position, (b) a stop means in position to engage the advancing means when advanced to test position, (c) other stop means in position to engage said advancing means when returned to retracted position, (IV) means for latching said advancing means in test position in response to advancement of a suitable material for test including (a) an abutment on said advancing means, (b) a latching member shiftable into and out of the path of said abutment between latching and unlatching positions respectively, (c) switch means operative in response to advancement to test of a material suitable for testing, (d) means controlling movement of said latching member between latching and unlatching position in response to operation of said switch means, and (V) means for effecting removal of said material from test position in response to the finding of acceptability of the material in test including (a) an actuating member mounted for shifting movement between normal and operated positions through the path of said material to effect displacement thereof during movement from normal to operated position, (b) means for effecting displacement of said actuating member from normal to operated position, (c) means for releasing said latching means responsive to completion of the test and subsequent to operation of said actuating member when the latter operates to remove an acceptable material, and (d) means operative in combination with said actuating member for operative engagement of said material upon displacement with the actuating member to operated position.

5. In a device for testing a material having light transmission characteristics and configurations imprinted or embodied therein, (I) a housing, (II) a test section within the housing including
   (a) a light source,
   (b) a plurality of light responsive cells in spaced relation from said light source and arranged in a predetermined pattern with respect to portions of said material with and without configurations,
(III) a material advancing means shiftable between a retracted position and a test position for advancing said material to a predetermined position between said light source and said light cells when in test position including
   (a) a receiver in said advancing means located outside of said housing when in retracted position and between said light source and light cells when in test position,
   (b) means for guiding said material advancing means during movement between retracted and test position,
(IV) means for latching said advancing means in test position in response to advancement of a suitable material for test including
   (a) an abutment on said advancing means,
   (b) a latching member shiftable into and out of the path of said abutment between latching and unlatching positions respectively,
   (c) switch means operative in response to advancement to test of a material suitable for testing,
   (d) means controlling movement of said latching member between latching and unlatching position in response to operation of said switch means, and
(V) means for effecting removal of said material from test position in response to the finding of acceptability of the material in test including
   (a) an actuating member mounted for shifting movement between normal and operated positions through the path of said material to effect displacement thereof during movement from normal to operated position,
   (b) means for effecting displacement of said actuating member from normal to operated position,
   (c) means for releasing said latching means responsive to completion of the test and subsequent to operation of said actuating member when the latter operates to remove an acceptable material, and
   (d) means operative in combination with said actuating member for operative engagement of said material upon displacement with the actuating member to operated position.

6. In a device for testing a material having light transmission characteristics and configurations imprinted or embodied therein,
(I) a housing,
(II) a test section within the housing including
   (a) a light source,
   (b) a plurality of light responsive cells in spaced relation from said light source and arranged in a predetermined pattern with respect to portions of said material with and without configurations,
(III) a material advancing means shiftable between a retracted position and a test position for advancing said material to a predetermined position between said light source and said light cells when in test position including
   (a) a receiver in said advancing means located outside of said housing when in retracted position and between said light source and light cells when in test position,
   (b) means for guiding said material advancing means during movement between retracted and test position,
   (c) a stop means in position to engage the advancing means when advanced to test position,
   (d) other stop means in position to engage said advancing means when returned to retracted position,
(IV) means for latching said advancing means in test position in response to advancement of a suitable material for test including
   (a) an abutment on one of the elements including the latching means and a stationary supporting frame and latching means on the other of the elements shiftable into and out of the path of the abutment between latching and unlatching position,
   (b) switch means operative in response to advancement to test of a material suitable for testing,
   (c) means controlling movement of said latching member between latching and unlatching position in response to operation of said switch means, and
(V) means for effecting removal of said material from test position in response to the finding of acceptability of the material in test including
   (a) an actuating member mounted for shifting movement between normal and operated positions through the path of said material to effect displacement thereof during movement from normal to operated position,
   (b) means for effecting displacement of said actuating member from normal to operated position,
   (c) means for releasing said latching means responsive to completion of the test and subsequent to operation of said actuating member when the latter operates to remove an acceptable material, and
   (d) means operative in combination with said actuating member for operative engagement of said material upon displacement with the actuating member to operated position.

7. In a device for testing a material having light transmission characteristics and configurations imprinted or embodied therein,
(I) a housing,
(II) a test section within the housing including
   (a) a light source,
   (b) a plurality of light responsive cells in spaced relation from said light source and arranged in a predetermined pattern with respect to portions of said material with and without configurations,
(III) a material advancing means shiftable between a retracted position and a test position for advancing said material to a predetermined position between said light source and said light cells when in test position including
   (a) a receiver in said advancing means located outside of said housing when in retracted position and between said light source and light cells when in test position,
   (b) means for guiding said material advancing means during movement between retracted and test position,
   (c) a stop means in position to engage the advancing means when advanced to test position,
   (d) other stop means in position to engage said advancing means when returned to retracted position,
(IV) means for latching said advancing means in test position in response to advancement of a suitable material for test including
   (a) an abutment on said advancing means,
   (b) a latching member shiftable into and out of the path of said abutment between latching and unlatching positions respectively,
   (c) switch means operative in response to advancement to test of a material suitable for testing,
 (d) means controlling movement of said latching member between latching and unlatching position in response to operation of said switch means, and (V) means for effecting removal of said material from test position in response to the finding of acceptability of the material in test including
 (a) an actuating member mounted for shifting movement between normal and operated positions through the path of said material to effect displacement thereof during movement from normal to operated position,
 (b) means for releasing said latching means responsive to completion of the test and subsequent to operation of said actuating member when the latter operates to remove an acceptable material, and
 (c) means operative in combination with said actuating member for operative engagement of said material upon displacement with the actuating member to operated position.

8. In a device for testing a material having light transmission characteristics and configurations imprinted or embodied therein, (I) a housing, (II) a test section within the housing including
 (a) a light source,
 (b) a plurality of light responsive cells in spaced relation from said light source and arranged in a predetermined pattern with respect to portions of said material with an without configurations, (III) a material advancing means shiftable between a retracted position and a test position for advancing said material to a predetermined position between said light source and said light cells when in test position including
 (a) a receiver in said advancing means located outside of said housing when in retracted position and between said light source and light cells when in test position,
 (b) means for guiding said material advancing means during movement between retracted and test position,
 (c) a stop means in position to engage the advancing means when advanced to test position,
 (d) other stop means in position to engage said advancing means when returned to retracted position, (IV) means for latching said advancing means in test position in response to advancement of a suitable material for test including
 (a) an abutment on said advancing means,
 (b) a latching member shiftable into and out of the path of said abutment between latching and unlatching positions respectively,
 (c) switch means operative in response to advancement to test of a material suitable for testing,
 (d) means controlling movement of said latching member between latching and unlatching position in response to operation of said switch means, and (V) means for effecting removal of said material from test position in response to the finding of acceptability of the material in test including
 (a) an actuating member mounted for shifting movement between normal and operated positions through the path of said material to effect displacement thereof during movement from normal to operated position,
 (b) means for effecting displacement of said actuating member from normal to operated position,
 (c) means for releasing said latching means responsive to completion of the test and subsequent to operation of said actuating member when the latter operates to remove an acceptable material.

References Cited in the file of this patent

UNITED STATES PATENTS

| | | |
|---|---|---|
| 2,147,954 | Kozel | Feb. 21, 1939 |
| 2,267,599 | Bradt | Dec. 23, 1941 |
| 2,369,794 | Phinney et al. | Feb. 20, 1945 |
| 2,578,951 | Shaver | Dec. 18, 1951 |
| 2,592,202 | Smith | Apr. 8, 1952 |
| 2,646,717 | Selgin | July 28, 1953 |
| 2,659,470 | DuPont | Nov. 17, 1953 |
| 2,686,525 | Jaskowiak | Aug. 17, 1954 |
| 2,896,763 | Gisser | July 28, 1959 |
| 2,922,893 | Ett | Jan. 26, 1960 |
| 2,932,392 | Burtner | Apr. 12, 1960 |
| 2,936,684 | Simjian | May 17, 1960 |
| 2,941,187 | Simjian | June 14, 1960 |
| 2,590,799 | Timms | Aug. 30, 1960 |

UNITED STATES PATENT OFFICE
CERTIFICATE OF CORRECTION

Patent No. 3,108,693                          October 29, 1963

William A. Patzer

It is hereby certified that error appears in the above numbered patent requiring correction and that the said Letters Patent should read as corrected below.

Column 4, line 53, for "displayed" read -- displaced --; column 5, line 5, for "part" read -- apart --; column 6, line 11, for "commuator" read -- commutator --; column 7, line 11, for "In the event that the ibll is found to be acceptable, means" read -- Displacement of the guillotine between retracted and --; column 14, line 16, for "embodiment" read -- embodied --; column 17, line 33, for "an" read -- and --; column 18, line 49, for "2,590,799" read -- 2,950,799 --.

Signed and sealed this 28th day of April 1964.

(SEAL)
Attest:

ERNEST W. SWIDER                                     EDWARD J. BRENNER
Attesting Officer                                            Commissioner of Patents